(12) United States Patent
Sato (10) Patent No.: US 7,403,545 B2
(45) Date of Patent: Jul. 22, 2008

(54) RADIO COMMUNICATION SYSTEM AND APPARATUS

(75) Inventor: Kazumi Sato, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 844 days.

(21) Appl. No.: 10/102,835

(22) Filed: Mar. 22, 2002

(65) Prior Publication Data

US 2002/0136189 A1 Sep. 26, 2002

(30) Foreign Application Priority Data

Mar. 26, 2001 (JP) ............................ 2001-087040

(51) Int. Cl.
*H04J 3/06* (2006.01)

(52) U.S. Cl. .................. 370/503; 375/355; 455/522

(58) Field of Classification Search .................. None
See application file for complete search history.

(56) References Cited

U.S. PATENT DOCUMENTS

| 5,566,172 | A | | 10/1996 | Mourot | |
|---|---|---|---|---|---|
| 5,781,540 | A | * | 7/1998 | Malcolm et al. | 370/321 |
| 5,841,601 | A | * | 11/1998 | Fisher | 360/48 |
| 6,084,888 | A | * | 7/2000 | Watanabe et al. | 370/473 |
| 6,084,905 | A | * | 7/2000 | Ishifuji et al. | 375/133 |
| 6,169,759 | B1 | * | 1/2001 | Kanterakis et al. | 375/130 |
| 6,181,497 | B1 | * | 1/2001 | Malone, Sr. | 360/48 |
| 6,252,865 | B1 | * | 6/2001 | Walton et al. | 370/335 |
| 6,259,709 | B1 | * | 7/2001 | Schnizlein et al. | 370/509 |
| 6,285,681 | B1 | * | 9/2001 | Kolze et al. | 370/442 |
| 6,307,868 | B1 | * | 10/2001 | Rakib et al. | 370/485 |
| 6,317,452 | B1 | * | 11/2001 | Durrant et al. | 375/130 |
| 6,370,158 | B1 | * | 4/2002 | O'Scolai et al. | 370/503 |
| 6,426,973 | B1 | * | 7/2002 | Madhow et al. | 375/231 |
| 6,993,092 | B1 | * | 1/2006 | Murakami et al. | 375/298 |
| 7,027,464 | B1 | * | 4/2006 | Nakahara et al. | 370/503 |
| 7,031,344 | B2 | * | 4/2006 | Rakib et al. | 370/479 |
| 7,280,295 | B2 | * | 10/2007 | Dati et al. | 360/51 |
| 2002/0015423 | A1 | * | 2/2002 | Rakib et al. | 370/485 |
| 2002/0071480 | A1 | * | 6/2002 | Marjelund et al. | 375/141 |

(Continued)

FOREIGN PATENT DOCUMENTS

EP 0 903 872 3/1999

(Continued)

OTHER PUBLICATIONS

U.S. Appl. No. 09/820,937, filed Mar. 30, 2001, pending.

(Continued)

*Primary Examiner*—Edan Orgad
*Assistant Examiner*—Salman Ahmed
(74) *Attorney, Agent, or Firm*—Oblon, Spivak, McClelland, Maier & Neustadt, P.C.

(57) ABSTRACT

A radio communication system for transmitting a radio signal with a transmission format in which a channel response calculation preamble signal serving as a reference upon reception is inserted is disclosed. The output frequency of channel response calculation preamble signals is varied in accordance with a temporal change in radio propagation environment. A channel response variation measurement unit measures a variation of the radio propagation environment. A channel response calculation preamble signal output frequency setting unit sets the output frequency of preamble signals in accordance with the temporal change in radio propagation environment. The preamble signals are inserted in the transmission format to be transmitted at that frequency.

8 Claims, 6 Drawing Sheets

U.S. PATENT DOCUMENTS

| | | | |
|---|---|---|---|
| 2002/0090965 A1 * | 7/2002 | Chen et al. | 455/522 |
| 2002/0097780 A1 * | 7/2002 | Odenwalder et al. | 375/146 |
| 2002/0131393 A1 * | 9/2002 | Baldridge | 370/343 |
| 2003/0156603 A1 * | 8/2003 | Rakib et al. | 370/485 |
| 2004/0247043 A1 * | 12/2004 | Murakami et al. | 375/302 |
| 2005/0117549 A1 * | 6/2005 | Kanterakis et al. | 370/335 |
| 2006/0104195 A1 * | 5/2006 | Nakahara et al. | 370/203 |

FOREIGN PATENT DOCUMENTS

| | | | |
|---|---|---|---|
| EP | 1107597 A2 * | 6/2001 | |
| GB | 2 329 796 | 3/1999 | |
| WO | WO9965180 | * | 12/1999 |
| WO | WO0007377 | * | 2/2000 |
| WO | WO0161878 | * | 8/2001 |
| WO | WO0163870 | * | 8/2001 |
| WO | WO0199312 | * | 12/2001 |

OTHER PUBLICATIONS

S. Nanda, et al., IEEE Communications Magazine, vol. 38, No. 1, pp. 54-64, XP-00908338, "Adaptation Techniques in Wireless Packet Data Services", Jan. 2000.

U.S. Appl. No. 10/102,835, filed Mar. 22, 2002, pending.

U.S. Appl. No. 10/252,443, filed Sep. 24, 2002, pending.

* cited by examiner

RADIO COMMUNICATION SYSTEM AND APPARATUS

CROSS-REFERENCE TO RELATED APPLICATIONS

This application is based upon and claims the benefit of priority from the prior Japanese Patent Application No. 2001-087040, filed Mar. 26, 2001, the entire contents of which are incorporated herein by reference.

BACKGROUND OF THE INVENTION

1. Field of the Invention

The present invention relates to a radio communication apparatus, system and method for transmitting a radio signal in accordance with a transmission format in which a channel response calculation preamble signal serving as a reference is inserted.

2. Description of the Related Art

In recent years, a radio data communication system which can make high-speed data communications indoors or outdoors is required. In a radio communication system that implements high-speed data communications, distortions due to multi-pass interference, i.e., reception of a transmitted signal via various routes due to reflection by buildings, and the like, must be compensated for.

When a transmitter transmits a known reference signal (channel response calculation preamble signal), a receiver calculates the channel response of the channel response calculation preamble signal. The channel response indicates the degree of distortion of phase, amplitude, or the like. The receiver multiplies the received data signal by the inverse characteristic of the channel response to compensate the received data signal for any distortion.

Conventionally, an insertion method of the channel response calculation preamble signal is fixed in a system. This method includes a method of inserting a channel response calculation preamble signal at given time intervals, a method of inserting at the head of a packet or frame sent toward a given user, and the like.

When a channel variation is large with respect to a packet length, the channel response calculation result obtained from the channel response calculation preamble signal has a large error from the channel distortion which is actually superposed on the data.

In order to reduce such error, when the frequency of insertion of the channel response calculation preamble signal is increased, the data transmission efficiency lowers when the channel variation is small.

As described above, in the conventional radio communication system and radio transmission apparatus, a large error is generated between the channel response calculated from the channel response calculation preamble signal and the channel distortion superposed on data due to a channel variation and, as a result, a reception error rate impairs. In order to reduce the error between the calculated channel response and distortion superposed on data, if the frequency of output of the channel response calculation preamble signal is fixed to be high, the data transmission efficiency lowers when the channel variation is small.

BRIEF SUMMARY OF THE INVENTION

It is, therefore, an object of the present invention to provide a radio communication apparatus, system and method, which can accurately calculate a channel response and can reduce any transmission error even when the channel variation is large.

According to one aspect of the present invention, a radio communication method for transmitting a transmitted signal including a preamble signal used for calculating a channel response at a receiving side, comprises setting an output frequency of the preamble signal based on a temporal change of a radio propagation environment; and generating the transmitted signal by inserting the preamble signal in accordance with the output frequency.

With this method, when the channel variation is large, the frequency of output of the channel response calculation preamble signal can be increased, and distortion correction that traces the channel variation along with an elapse of time can be made. On the other hand, when the channel variation is small, the frequency of output of the channel response calculation preamble signal can be decreased, and the data transmission efficiency can be improved.

DETAILED DESCRIPTION OF THE INVENTION

A radio transmission system and apparatus according to an embodiment of the present invention will be described hereinafter with reference to the accompanying drawings.

Figure 1:
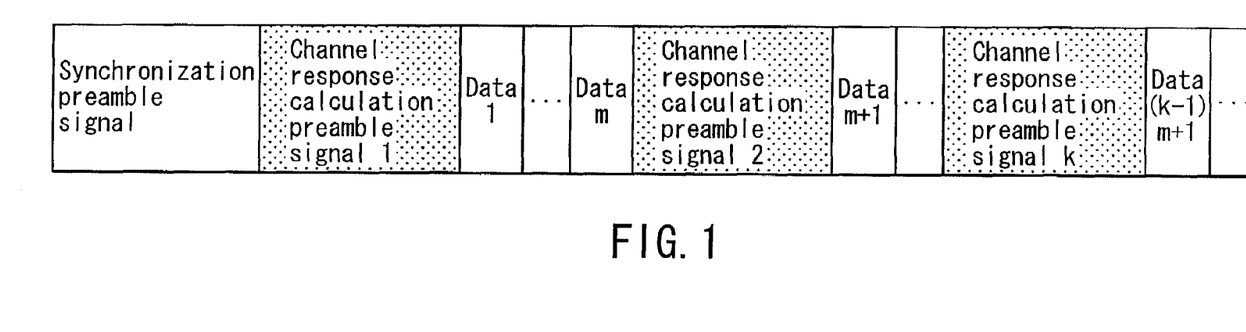
FIG. 1 shows an example of the transmitted signal format of a radio communication system according to the present invention.

FIG. 1 shows an example of the transmitted signal format of a radio communication system according to the present invention. A transmitted signal is made up of a synchronization preamble signal, at least one channel response calculation preamble signal (k signals in FIG. 1), and a plurality of data. The number of channel response calculation preamble signals is variable in accordance with a channel variation. The transmitting side controls the frequency of the channel response calculation preamble signal in accordance with the channel variation.

Figure 2A:
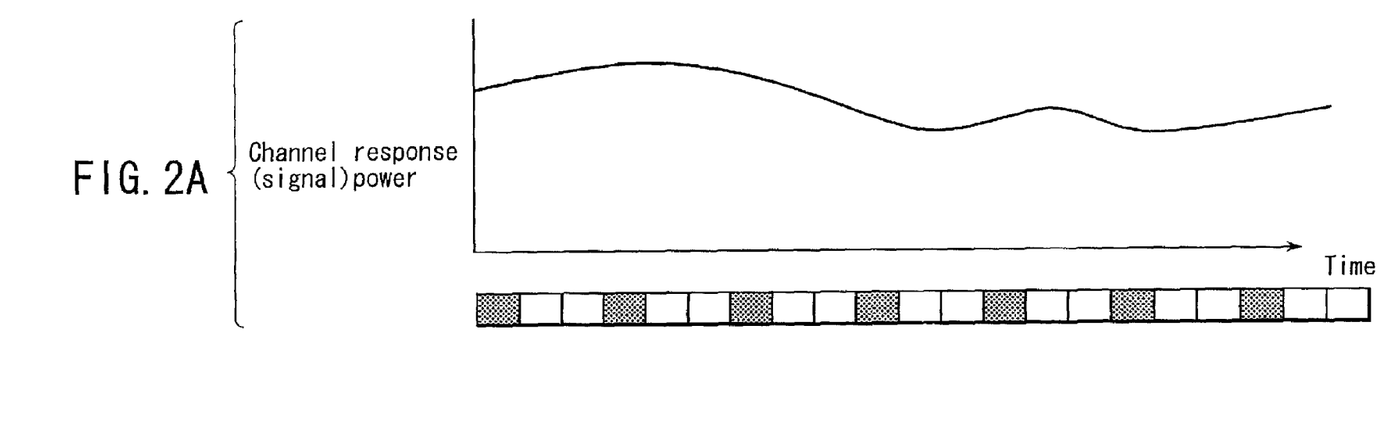
FIG. 2A is a graph showing a temporal variation of (signal) power as a channel response when the variation is large.
Figure 2B:
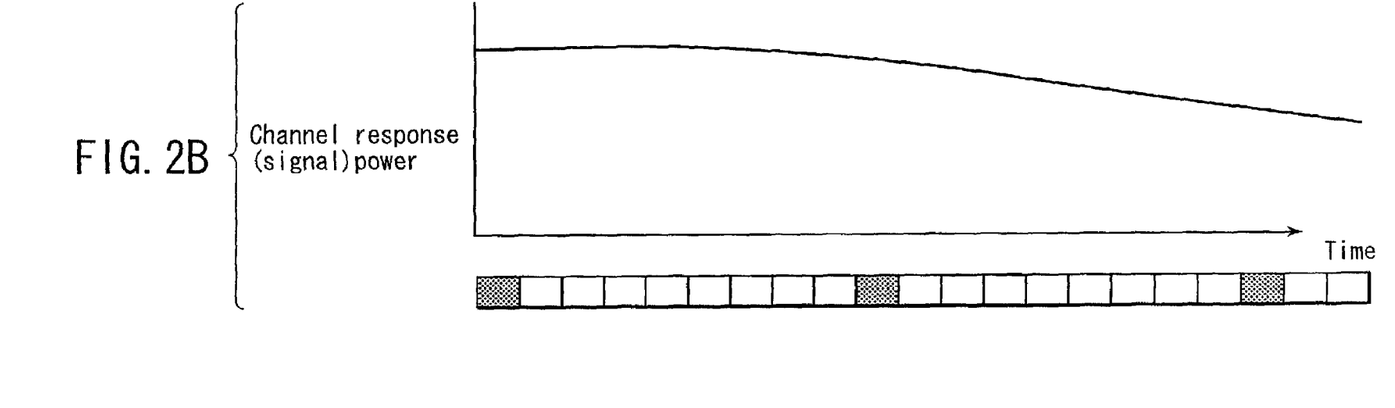
FIG. 2B is a graph showing a temporal variation of power as a channel response when the variation is small.

FIGS. 2A and 2B are examples of graphs showing temporal variations of power as a channel response. The abscissa shows time, and the ordinate shows the intra-band average power of the channel response. FIG. 2A shows a temporal variation of power when the temporal variation of channel response is large, and FIG. 2B shows a temporal variation of power when the temporal variation of channel response is small.

An appropriate channel format corresponding to the temporal variation of power of the channel response is shown below each graph that shows the temporal variation of power of the channel response. As shown in FIG. 2A, when the temporal variation of channel response is large, the frequency of insertion of channel response calculation preamble signal is increased. A channel response to be calculated to compensate for a data distortion can be updated in correspondence with the temporal variation of channel response. Therefore, a transmission error can be reduced. That is, when the temporal variation of channel response is large, a data length m between two channel response calculation preamble signals is set to be a small value, thus reducing transmission errors.

On the other hand, as shown in FIG. 2B, when the temporal variation of channel response is small, the frequency of insertion of the channel response calculation preamble signal is decreased, since the channel response need not be calculated frequently. As a result, the ratio of the total length of channel response calculation preamble signals to the total data length decreases. Hence, the data transmission efficiency can be improved.

In brief, according to the present invention, the number of channel response calculation preamble signals inserted is varied in accordance with the temporal variation of channel response.

Figure 3:
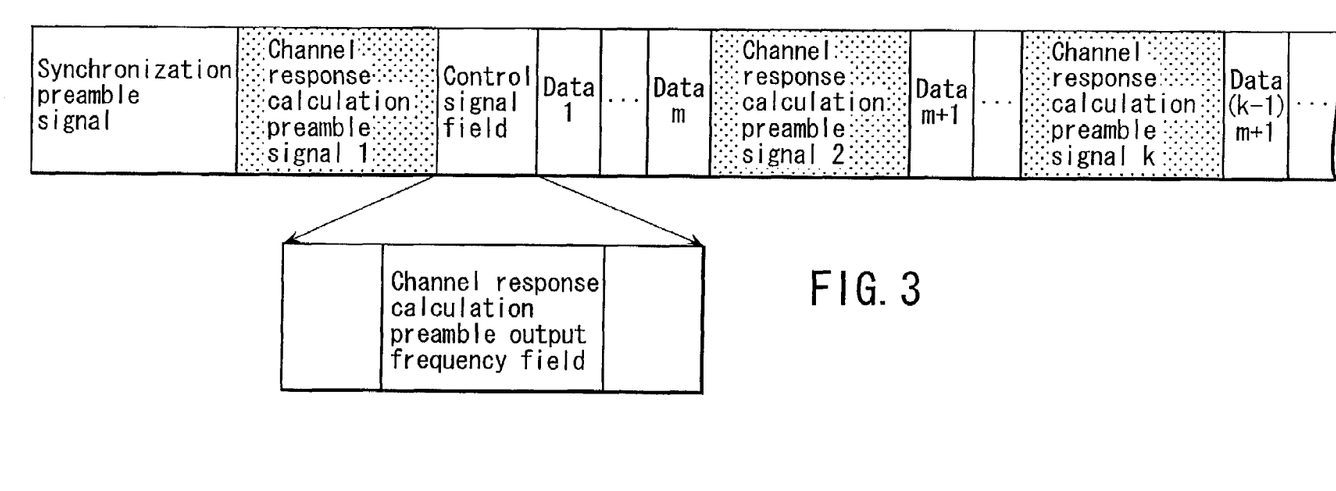
FIG. 3 shows an example of the transmitted signal format of a radio communication system according to the present invention.
Figure 4:
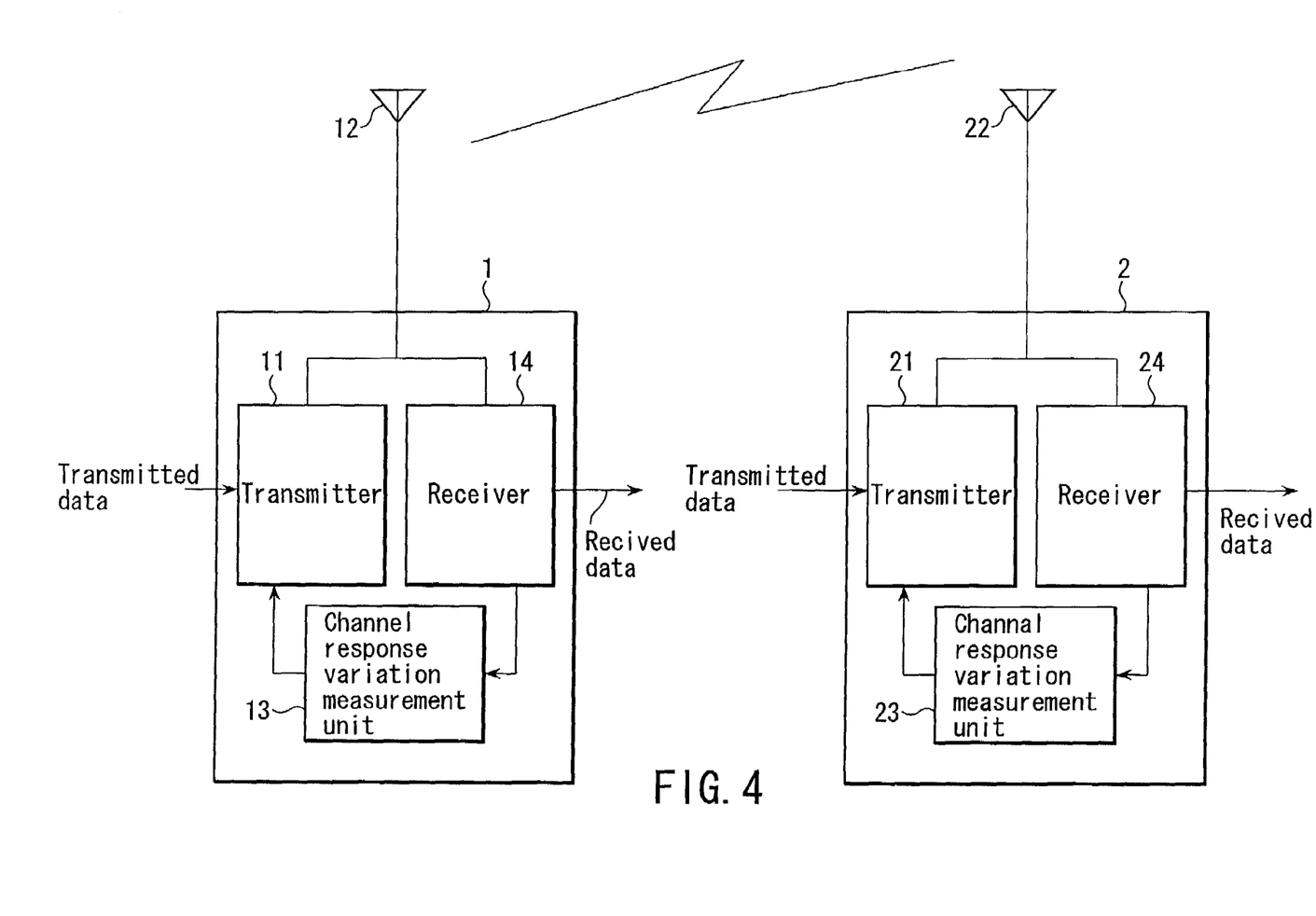
FIG. 4 is a block diagram showing an embodiment of a radio transmission apparatus according to the present invention.
Figure 5:
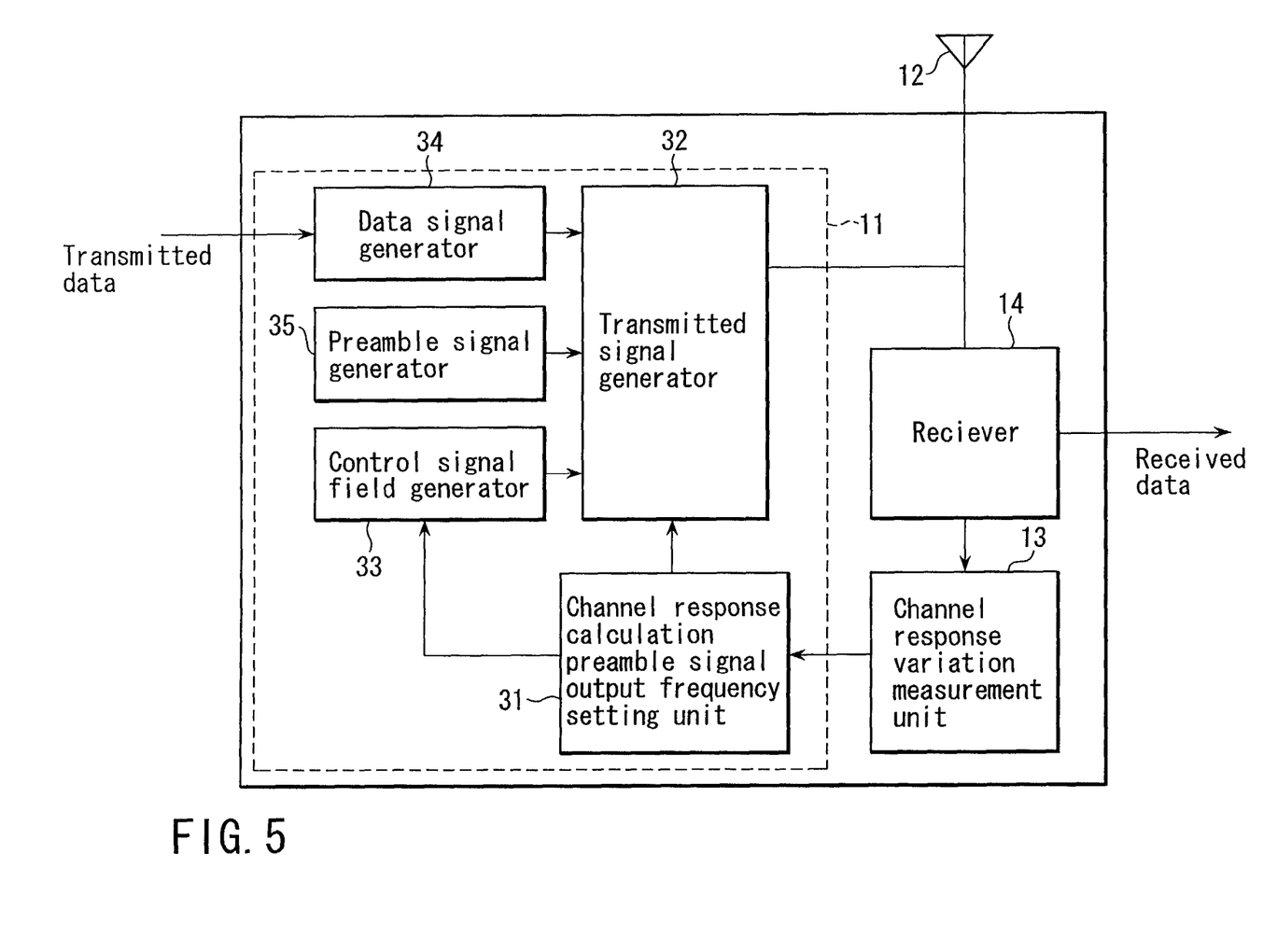
FIG. 5 is a block diagram showing an embodiment of a radio transmission apparatus according to the present invention.
Figure 6:
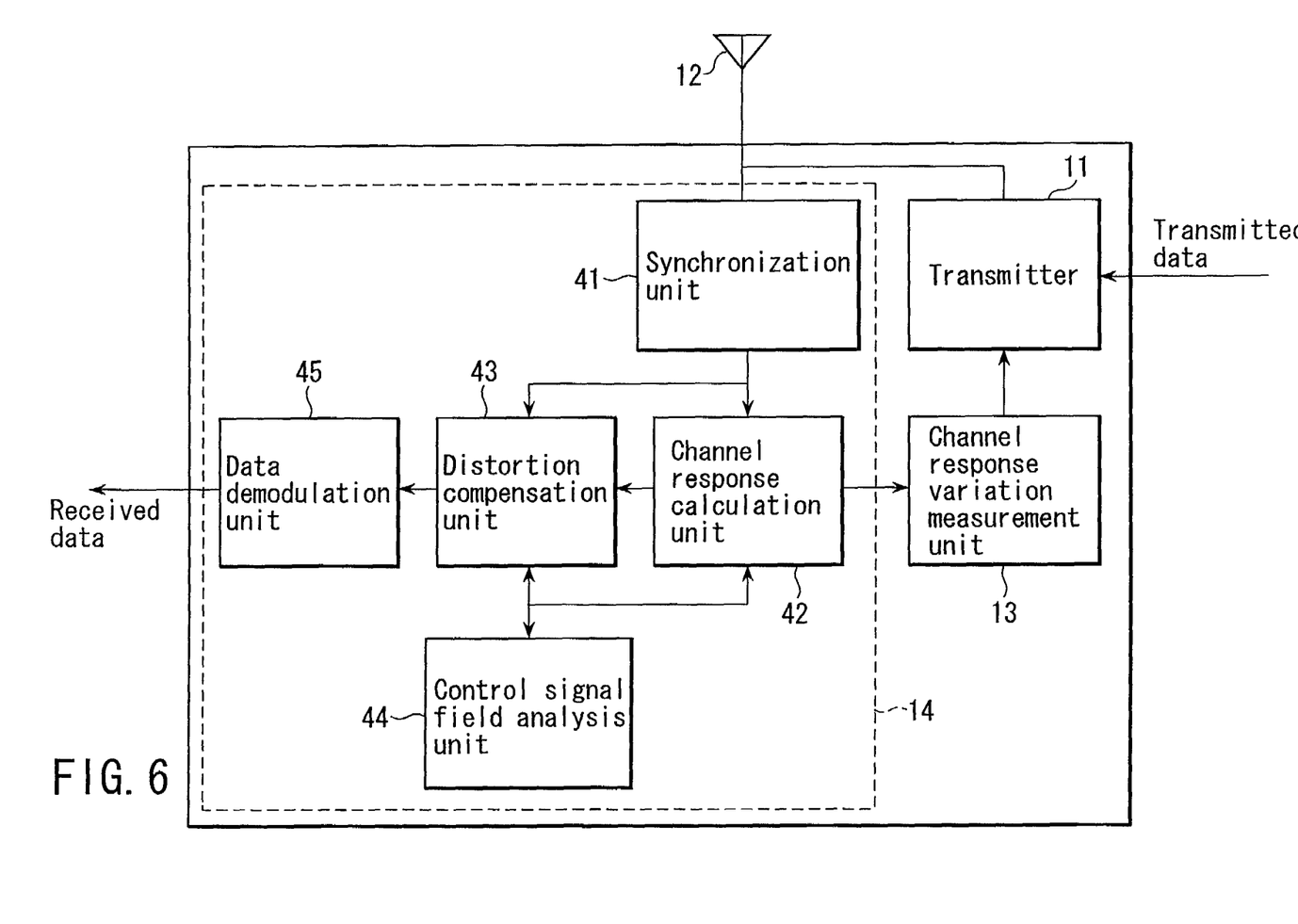
FIG. 6 is a block diagram showing an embodiment of a radio transmission apparatus according to the present invention.

One embodiment of the present invention will be described below. FIG. 3 shows an example of the transmitted signal format in a radio communication system and radio transmission apparatus according to an embodiment of the present invention, and FIGS. 4, 5, and 6 are block diagrams.

In the transmitted signal format shown in FIG. 3, a control signal field written with control information, which is used to demodulate data, is added to the transmitted signal format shown in FIG. 1. Since this control signal field is included, the receiving side can normally demodulate data by recognizing control information written in the control signal field.

In FIG. 3, the control signal field is inserted immediately after the first channel response calculation preamble signal, but its insertion position is not particularly limited. The control signal field contains a channel response calculation preamble signal output frequency field. The transmitting side writes transmission frequency information of channel response calculation preamble signals in the channel response calculation preamble signal output frequency field. The receiving side can detect the transmission frequency of channel response calculation preamble signals set at the transmitting side with reference to the contents of the channel response calculation preamble signal output frequency field, and can calculate a channel response at a correct timing.

That is, in the transmitted signal format shown in FIG. 3, since the synchronization preamble signal and channel response calculation preamble signal are always attached to the head of a packet. If the receiving side can detect the output frequency, it can detect the position of the next channel response calculation preamble signal. The output frequency indicates that channel response calculation preamble signals are inserted every n symbols, for example.

FIG. 4 shows an example of a radio transmission apparatus according to the present invention. A base station 1 and terminal 2 have radio transmission apparatuses with the same arrangement. A transmitter 11 of the base station 1 transmits a transmitted signal which contains transmitted data and channel response calculation preamble signals in the transmission format shown in FIG. 3 from an antenna 12. Note that an optimal number of channel response calculation preamble signals is set in accordance with channel variation information output from a channel variation measurement unit 13.

The terminal 2 receives the transmitted signal transmitted from the base station 1 by an antenna 22, and this signal is input to a receiver 24. The receiver 24 executes a reception process such as transmission distortion compensation and the like of a received signal using channel response calculation preamble signals, and outputs received data. Also, the receiver 24 outputs information used to measure a variation of channel response to a channel response variation measurement unit 23. As an input signal to the channel response variation measurement unit 23, a channel response calculation result or the like of the received signal is used. The channel response variation measurement unit 23 measures a variation of channel response, and outputs the measurement result to a transmitter 21.

Note that the measurement method of the variation of channel response includes:

1. a method of measuring a change in amplitude or phase from that of the previously calculated channel response every time a channel response is calculated, in consideration of a subcarrier (one or a plurality of subcarriers) that includes the calculated channel response;

2. a method of measuring the total (or average) power of respective symbols (as well as data), and measuring a change in amplitude (=power) or phase;

3. a method of measuring a change in amplitude or phase of a pilot carrier (for estimating a distortion) contained in each symbol; and the like.

Furthermore, the transmitter 21 executes the same process as the transmission process of the base station 1, and outputs a transmitted signal to the base station 1 again. In this manner, a signal is transmitted between the base station 1 and terminal 2.

FIG. 5 is a block diagram for explaining the transmitter 11 of the radio transmission apparatus shown in FIG. 4. Since the radio transmission apparatuses of the base station 1 and terminal 2 have the same arrangement, the transmitter 11 of the base station 1 will be explained as an example.

The signal which is received by the antenna 12 and has the transmission format shown in FIG. 3 is input to a receiver 14. The receiver 14 executes a reception process of the received signal (to be described later), and outputs information used to measure a variation of channel response to a channel response variation measurement unit 13. As an input signal to the channel response variation measurement unit 13, for example, a channel response calculation result or the like is used. The channel response variation measurement unit 13 measures a variation of channel response, and outputs the measurement result to a channel response calculation preamble signal output frequency setting unit 31.

The channel response calculation preamble signal output frequency setting unit 31 determines an optimal output frequency of channel response calculation preamble signals using the measurement result of the channel response variation, and informs a transmitted signal generator 32 and control signal field generator 33 of the output frequency of channel response calculation preamble signals.

The control signal field generator 33 writes information of the channel response calculation preamble signal output frequency in the control signal field.

Furthermore, transmitted data is converted into a data signal by a data signal generator 34, and the data signal, a synchronization preamble signal and channel response calculation preamble signals generated by a preamble signal generator 35, and the control signal field generated by the control signal field generator 33 are input to the transmitted signal generator 32. The transmitted signal generator 32 generates a transmitted signal based on the transmitted signal format shown in FIG. 3, and outputs it from the antenna 12.

At this time, the channel response calculation preamble signals are inserted at the frequency set by the channel response calculation preamble signal output frequency setting unit 31. In this manner, the output frequency of channel response calculation preamble signals can be changed in accordance with a variation of channel response.

FIG. 6 is a block diagram for explaining the receiver 14 of the radio transmission apparatus of the base station 1 shown in FIG. 4.

Referring to FIG. 6, the signal which is received by the antenna 12 and has the transmission format shown in FIG. 3 is input to a synchronization unit 41. The synchronization unit 41 synchronizes the received signal, and outputs the synchronized received signal to a channel response calculation unit 42 and distortion compensation unit 43. When a channel response is calculated using a channel response calculation preamble signal, the channel response calculation preamble signal is input to the channel response calculation unit 42, and other signals are input to the distortion compensation unit 43.

The channel response calculated by the channel response calculation unit 42 is input to the distortion compensation unit 43. The distortion compensation unit 43 compensates the received signal for any distortion using the channel response calculated by the channel response calculation unit 42. Of the distortion-compensated signal, the control signal field is input to a control signal field analysis unit 44, which reads out control information required to demodulate, and supplies it to a data demodulation unit 45. The data demodulation unit 45 demodulates the distortion-compensated signal, and outputs the demodulated signal as received data.

Furthermore, the control signal field analysis unit 44 reads out information indicating the channel response calculation preamble signal output frequency, and informs the distortion compensation unit 43 and channel response calculation unit 42 of that channel response calculation preamble signal output frequency.

The channel response calculation unit 42 supplies a channel response calculation preamble signal to the channel variation measurement unit 13, which measures the variation of channel response. The frequency of channel response calculation preamble signals to be inserted in the transmitted signal format by the transmitter 11 is changed in accordance with the measurement result.

In the radio transmission system with the above arrangement, since the frequency of channel response calculation preamble signals to be inserted in the signal format to be transmitted is changed in accordance with the channel variation, the channel response can be accurately calculated even when the channel variation is large, and a transmission error can be reduced.

Since the channel response calculation preamble signal output frequency is sent to the distortion compensation unit 43 and channel response calculation unit 42, a channel response can be calculated at an accurate timing, and accurate distortion compensation can be made.

Upon receiving this format, the channel response calculation unit 42 can correctly recognize the reception timing of a channel response calculation preamble signal based on the received channel response calculation preamble signal output frequency information, and can calculate a channel response at a correct timing. Also, the distortion correction unit 43 can correctly recognize the distortion compensation timing of data or the control signal field based on the received channel response calculation preamble signal output frequency. The distortion-compensated data is input to and demodulated by the demodulation unit 45. In this way, since the receiving side accurately recognizes the channel response calculation preamble signal output frequency, the data and control signal field can undergo distortion correction at correct timings. For this reason, even when the transmitting side varies the channel response calculation preamble signal output frequency, the data signal can be correctly demodulated.

The transmitted signal format shown in FIG. 3 contains the channel response calculation preamble signal output frequency field used to inform, from the transmitting side, the receiving side of the channel response calculation preamble signal transmission frequency. In place of assuring the control signal field, as shown in FIG. 1, information indicating the channel response calculation preamble signal output frequency may be contained in data.

In the above embodiment, the channel response calculation preamble signal output frequency information is written in the transmitted signal. However, in some cases, no channel response calculation preamble signal output frequency information may be written in the transmitted signal. In such case, the control signal field generator 33 of the transmitter, and the control signal analysis unit 44 of the receiver may be omitted.

When the channel response calculation preamble signal output frequency is not available, a method of calculating a correlation between each symbol and a channel response calculation preamble signal on the receiving side, and determining a symbol with high correlation as a channel response calculation preamble signal may be used.

Figure 7:
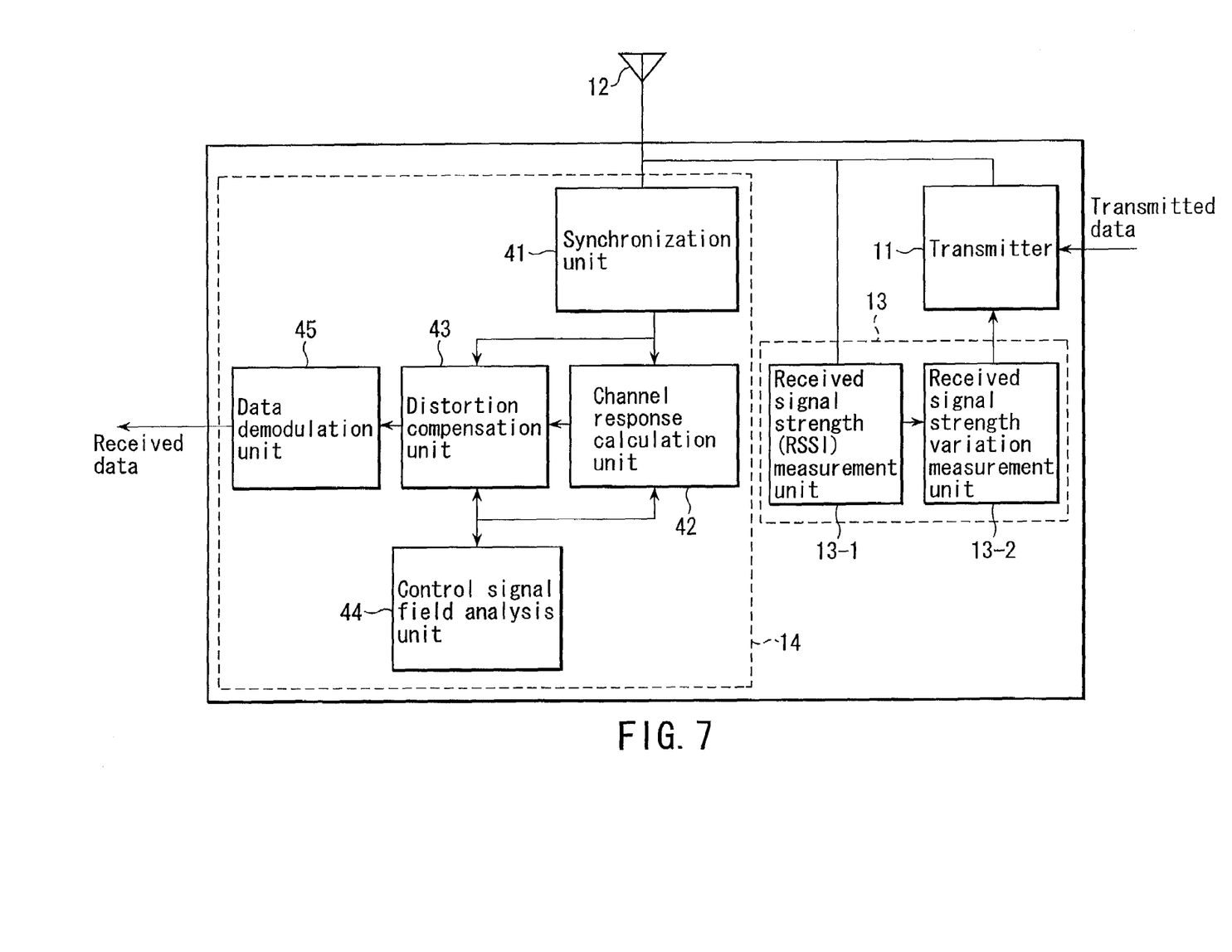
FIG. 7 is a block diagram showing another embodiment of a radio transmission apparatus according to the present invention.

As an input signal to the channel response variation measurement unit 13, received signal strength (RSSI) information of a received signal may be used. Using the RSSI, a variation of channel response is measured. In this case, as shown in FIG. 7, the channel response variation measurement unit 13 comprises a received signal strength measurement unit 13-1 and received signal strength variation measurement unit 13-2. The received signal strength measurement unit 13-1 measures the received signal strength of a received signal from the antenna 12, and the received signal strength variation measurement unit 13-2 measures a variation of received signal strength. Furthermore, the result of the received signal strength variation measurement unit 13-2 is input to the channel response calculation preamble signal output frequency setting unit 31 of the transmitter 11, thus setting the channel response calculation preamble signal output frequency in correspondence with the channel variation.

In the embodiment shown in FIG. 5, the channel response calculation preamble signal output frequency is set inside the transmitter of the radio transmission apparatus that generates a transmitted signal. However, some radio transmission system may receive channel response calculation preamble signal output frequency information from a communication partner. In such case, the channel response variation measurement unit 13 and channel response calculation preamble frequency setting unit 31 may be omitted. Channel response calculation preamble signals may be inserted into the transmission format of a transmitted signal based on the channel response calculation preamble signal transmission frequency provided from the communication partner.

Additional advantages and modifications will readily occur to those skilled in the art. Therefore, the invention in its broader aspects is not limited to the specific details and representative embodiments shown and described herein. Accordingly, various modifications may be made without departing from the spirit and scope of the general inventive concept as defined by the appended claims and their equivalents.

What is claimed is:

1. A radio communication apparatus comprising:
a receiver configured to receive a radio signal;
a calculation unit configured to calculate a channel response by use of the radio signal;
a channel response variation measurement unit configured to measure a change in amplitude or phase from that of a previously calculated channel response every time a channel response is calculated by the calculation unit, to determine a variation of a radio propagation environment based on the change;
a setting unit configured to set a frequency of insertion of a plurality of preamble signals based on the variation, wherein the preamble signals are used for calculating a channel response at a receiving side;
a transmitted signal generator configured to generate a transmitted signal by inserting the preamble signals in accordance with the frequency of insertion, wherein the preamble signals are separated with respect to time; and
a control signal field generator configured to generate an output frequency field indicating the frequency of insertion of the preamble signals,
wherein said transmitted signal generator inserts the output frequency field into the transmitted signal, and
the setting unit refers to the output frequency field contained in the received signal received by the receiver so as to control the frequency of insertion based on the output frequency field.

2. The apparatus according to claim 1, wherein the frequency of insertion of the preamble signals are increased as the variation of the radio propagation environment gets larger.

3. A radio communication method comprising:
receiving a radio signal;
calculating a channel response by using the radio signal;
measuring a change in amplitude or phase from that of a previously calculated channel response every time a channel response is calculated, to determine a variation of a radio propagation environment based on the change;
setting a frequency of insertion of a plurality of preamble signals based on the variation, wherein the preamble signals are used for calculating a channel response at a receiving side;
generating a transmitted signal by inserting the preamble signals in accordance with the frequency of insertion, wherein the preamble signals are separated with respect to time;
generating an output frequency field indicating the frequency of insertion of the preamble signals, the output frequency field being inserted into the transmitted signal; and
referring to the output frequency field contained in a received signal so as to control the frequency of insertion based on the output frequency field.

4. The method according to claim 3, wherein the frequency of insertion of the preamble signals are increased as the variation of the radio propagation environment gets larger.

5. A radio communication apparatus comprising:
a receiver configured to receive a radio signal having symbols;
a calculation unit configured to calculate a total power of the symbols;
a channel response variation measurement unit configured to measure a change in amplitude or phase of the total power, to determine a variation of a radio propagation environment based on the change;
a setting unit configured to set a frequency of insertion of a plurality of preamble signals based on the variation, wherein the preamble signals are used for calculating a channel response at a receiving side;
a transmitted signal generator configured to generate a transmitted signal by inserting the preamble signals in accordance with the frequency of insertion, wherein the preamble signals are separated with respect to time; and
a control signal field generator configured to generate an output frequency field indicating the frequency of insertion of the preamble signals,
wherein said transmitted signal generator inserts the output frequency field into the transmitted signal, and
the setting unit refers to the output frequency field contained in the received signal received by the receiver so as to control the frequency of insertion based on the output frequency field.

6. The apparatus according to claim 5, wherein the frequency of insertion of the preamble signals is increased as the variation of the radio propagation environment gets larger.

7. A radio communication apparatus comprising:
a receiver configured to receive a radio signal having symbols, the symbols each including a pilot carrier;
a channel response variation measurement unit configured to measure a change in amplitude or phase of the pilot carrier, to determine a variation of a radio propagation environment based on the change;
a setting unit configured to set a frequency of insertion of a plurality of preamble signals based on the variation, wherein the preamble signals are used for calculating a channel response at a receiving side;
a transmitted signal generator configured to generate a transmitted signal by inserting the preamble signals in accordance with the frequency of insertion, wherein the preamble signals are separated with respect to time; and
a control signal field generator configured to generate an output frequency field indicating the frequency of insertion of the preamble signals,
wherein said transmitted signal generator inserts the output frequency field into the transmitted signal, and
the setting unit refers to the output frequency field contained in the received signal received by the receiver so as to control the frequency of insertion based on the output frequency field.

8. The apparatus according to claim 7, wherein the frequency of insertion of the preamble signals is increased as the variation of the radio propagation environment gets larger.

* * * * *